July 26, 1949.　　　　Z. SWANSON　　　　2,477,217
SLICE THICKNESS GAUGE FOR SLICERS
Filed Oct. 17, 1947
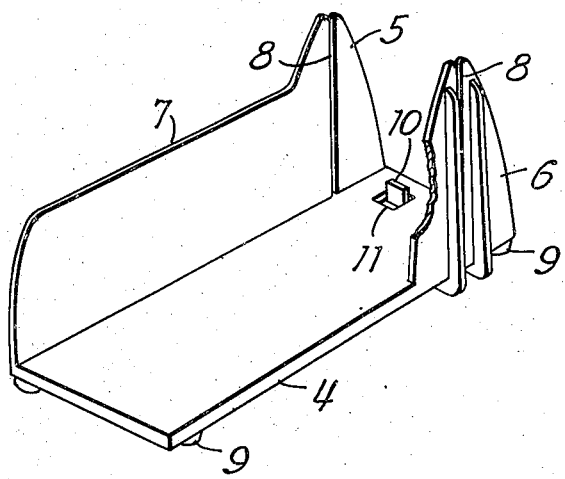
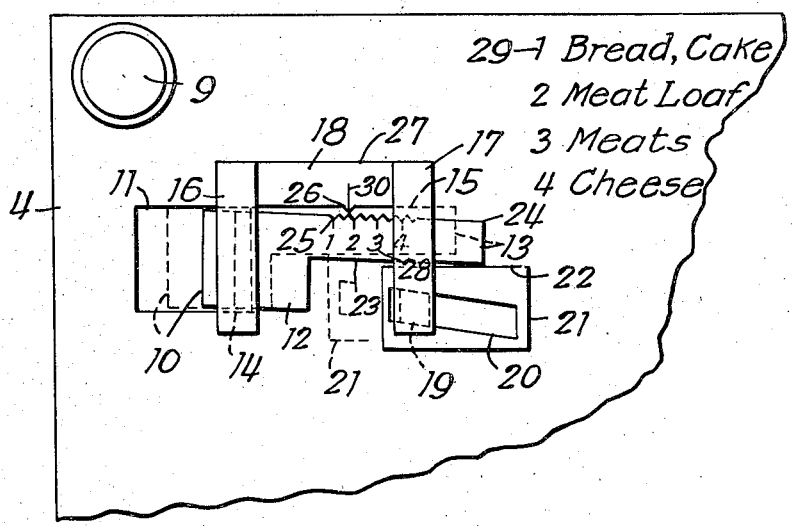
Inventor
Ziegner Swanson Patented July 26, 1949

2,477,217

UNITED STATES PATENT OFFICE 2,477,217

SLICE THICKNESS GAUGE FOR SLICERS

Ziegner Swanson, De Kalb, Ill.

Application October 17, 1947, Serial No. 780,521

8 Claims. (Cl. 146—150)

This invention relates to a new and improved slicer for cutting bread, cake, meat, cheese, pickles, and so forth, in slices of different thicknesses, and has for its principal object, the provision of a slice thickness gauge permitting much finer adjustments.

A salient feature of the slice thickness gauge of the present invention is the fact that there are no loose parts that may accidentally become disengaged and drop off and be lost or mislaid.

Another feature is the elimination of screws and nuts that require loosening and tightening whenever the gauge is reset, such means being objectionable from the standpoint that the screw or nut may loosen accidentally and throw the operator off on gauging the thickness of the slices without his realizing it, and there being the further objection that in some instances the resetting of such gauges required the use of tools.

The invention is illustrated in the accompanying drawing, in which

Fig. 1 is a perspective view of a slicer equipped with a slice thickness gauge made in accordance with my invention, and Fig. 2 is a bottom view of one corner portion of the slicer showing the gauge means on a larger scale.

The same reference numerals are applied to corresponding parts in these two views.

The slicer comprises a flat rectangular base 4 large enough to permit resting a loaf of bread on it so that it will be slidable freely between the opposed uprights 5 and 6 that are provided on one end portion of the base. An extension 7 of the upright 5 serves to guide the loaf and assist in keeping it aligned properly with the base so that slices of uniform thickness may be cut. The vertical slots 8 in the uprights 5 and 6 serve to guide the knife in cutting the bread, cake, meat, cheese, pickles or other food, being sliced. The base 4 is preferably provided with downwardly projecting feet 9 for support of the slicer in slightly elevated relation to the table or other support on which the slicer is used. The whole body of the slicer may be molded in one piece of plastic material.

The slice thickness may be gauged accurately by adjustment of a stop projection 10 lengthwise of the base 4 in a slot 11 provided in said base adjacent the slots 8 in the uprights 5 and 6. The stop 10 is in the form of a right angle projection provided on one end 12 of a slide 13 which is also preferably molded of plastic material to match the body of the slicer or give a pleasing contrast to the color of said body; although it may, of course, be made of any other suitable material. This slide 13 is guided in slots 14 and 15 provided in longitudinally spaced parallel arms 16 and 17 of a generally U-shaped member 18 that is also preferably molded of plastic material and is cemented or otherwise suitably secured to the bottom of the base 4 adjacent the slot 11. This member 18 likewise may, of course, be made of any other suitable material. A peg 19 of parallelogram shape is provided on one end of the arm 17 to define one side of the slot 15, and this peg has a close working fit in a slot 20 provided in a slidable key 21 extending lengthwise of the key at an acute angle with respect to the longitudinal edge portion 22 thereof which is arranged to have wedging locking engagement with the adjacent side 23 of the reduced end portion 24 of the slide 13. The slidable key 21 will also preferably be made of plastic material like the rest of the gauge, although it may, of course, be made of any suitable material. Serrations 25 are provided in uniformly spaced relation on one side of the reduced end portion 24 of the slide to cooperate with a tooth 26 provided on the adjacent side of the cross-portion 27 of the U-shaped member 18 whereby to enable setting the slide 13 selectively in any one of a plurality of positions of adjustment with the stop 10 correspondingly adjusted in the slot 11. There are, of course, enough serrations to cover the full range of adjustability of the stop 10 from one end of the slot 11 to the other. The serrations 25 may be numbered or marked in any other suitable manner, as indicated at 28, where numerals 1, 2, 3 and 4 are illustrated as applied to alternate serrations, the numeral 1 indicating the seating for the thickest slice of, say, $\frac{9}{16}''$ suitable for bread or cake, and number 4 indicating the setting for the smallest thickness of, say, $\frac{1}{16}''$ suitable for slicing cheese or pickles. The intermediate settings designated as 2, and 3 are for thickness of, say, $\frac{7}{16}''$ and $\frac{3}{16}''$, respectively, $\frac{7}{16}''$ thickness being suitable for meat loaves and the like, and $\frac{3}{16}''$ being suitable for slicing various meats. The intermediate serrations between the various numbers are for intermediate settings where a thicker or thinner slice is desired. A table is preferably provided on the bottom of the base 4, as indicated at 29, listing opposite the numerals 1, 2, 3 and 4, the different things that can be sliced at those settings, so that the operator does not have to resort to any guess work or rely on trial and error in setting the slice thickness gauge.

In operation, the slidable key 21 is pushed to the right to unlock the slide 13 when the gauge is to be reset, as shown in full lines in Fig. 2. Then the slide 13 is disengaged from tooth 26, as shown in full lines in Fig. 2, so that it can be moved endwise in either direction. Then, after the tooth 26 has been entered in a selected serration 25 for the thickness of slice, as indicated in the dotted line position of the slide 13 in Fig. 2, the key 21 is pushed to the left to the dotted line position shown wedgingly engaging the slide 13 to lock it securely in the adjusted position. The average housewife has no difficulty in making these settings for different slice thicknesses because of the simplicity of the operation and the fact that there is a table of information regarding the different settings immediately alongside the gauge, the markings at 28 being correlated in the table 29 with the different things to be sliced so as to eliminate any guess work. Inasmuch as there are no screws and nuts to tighten and loosen, the operation of changing the setting of the gauge takes a fraction of the time it would otherwise require, and there are no screws or nuts to get loose and require tightening from time to time or apt to drop off and be lost. All parts of the present gauge remain in assembled relation so that there is never any danger of a loose part dropping off and being misplaced or lost. If the serrations 25 and tooth 26 are omitted, an index mark 30 corresponding in location to tooth 26 is all that is needed to cooperate with the graduations on the slide 13 to enable the user to set the gauge as desired, and, of course, with such a construction the adjustment is infinite.

It is believed the foregoing description conveys a good understanding of the objects and advantages of my invention. The appended claims have been drawn to cover all legitimate modifications and adaptations.

I claim:

1. In a limit stop adjustment, the combination of a base having an elongated slot provided therein, a slide carrying a stop projection extending through said slot and adjustable lengthwise of said slot, guides for said slide on said base, interlocking means on the slide and base to hold the slide against endwise movement from an adjusted position, and a wedge operable in one of said guides to lock the slide so that said interlocking means remain interlocked, whereby positively to prevent movement of the slide from adjusted position.

2. In a limit stop adjustment, the combination of a base having an elongated slot provided therein, a slide carrying a stop projection extending through said slot and adjustable lengthwise of said slot, guides for said slide on said base, said slide having serrations in longitudinally spaced relation relative to said slide and slot, and said base having a tooth adapted to engage in a selected serration to locate the stop in a desired position in said slot, and a wedge operable in one of said guides to engage the slide wedgingly to hold the same releasably in adjusted position and prevent disengagement of the tooth from the selected serration.

3. In a limit stop adjustment, the combination of a base, a slide carrying a stop projection, guides for said slide on said base, interlocking means on the slide and base to hold the slide against endwise movement from an adjusted position, and a wedge operable in one of said guides to lock the slide so that said interlocking means remain interlocked, whereby positively to prevent movement of the slide from adjusted position.

4. In a limit stop adjustment, the combination of a base, a slide carrying a stop projection, guides for said slide on said base, said slide having serrations in longitudinally spaced relation relative to said slide, and said base having a tooth adapted to engage in a selected serration to locate the stop in a desired position, and a wedge operable in one of said guides to engage the slide wedgingly to hold the same releasably in adjusted position and prevent disengagement of the tooth from the selected serration.

5. In a limit stop adjustment, the combination of a base having an elongated slot provided therein, a slide carrying a stop projection extending through said slot and adjustable lengthwise of said slot, guides for said slide on said base, and a locking key slidable relative to one of said guides on a pin and slot connection, in which the slot extends at an acute wedging angle relative to said slide whereby said key serves to lock the slide releasably in adjusted position.

6. In a limit stop adjustment, the combination of a base having an elongated slot provided therein, a slide carrying a stop projection extending through said slot and adjustable lengthwise of said slot, guides for said slide on said base, said slide having serrations in longitudinally spaced relation relative to said slide and slot, and said base having a tooth adapted to engage in a selected serration to locate the stop in a desired position in said slot, and a locking key slidable relative to one of said guides on a pin and slot connection, in which the slot extends at an acute wedging angle relative to said slide whereby said key serves to lock the slide releasably in adjusted position so as to prevent disengagement of the tooth from the selected serration.

7. In a limit stop adjustment, the combination of a base, a slide carrying a stop projection, guides for said slide on said base, interlocking means on the slide and base to hold the slide against endwise movement from an adjusted position, and a locking key slidable relative to one of said guides on a pin and slot connection, in which the slot extends at an acute wedging angle relative to said slide whereby said key serves to lock the slide so that said interlocking means remain interlocked, whereby positively to prevent movement of the slide from adjusted position.

8. In a limit stop adjustment, the combination of a base, a slide carrying a stop projection, guides for said slide on said base, said slide having serrations in longitudinally spaced relation relative to said slide, and said base having a tooth adapted to engage in a selected serration to locate the stop in a desired position, and a locking key slidable relative to one of said guides on a pin and slot connection, in which the slot extends at an acute wedging angle relative to said slide whereby said key serves to lock the slide releasably in adjusted position so as to prevent disengagement of the tooth from the selected serration.

ZIEGNER SWANSON.

REFERENCES CITED

The following references are of record in the file of this patent:

UNITED STATES PATENTS

| Number | Name | Date |
|---|---|---|
| 1,356,067 | Higgs | Oct. 19, 1920 |

FOREIGN PATENTS

| Number | Country | Date |
|---|---|---|
| 2,042 | Great Britain | Jan. 24, 1884 |
| 1,064,650 | Italy | June 10, 1913 |